March 12, 1929.　　F. W. McARDLE　　1,705,024
MACHINE FOR FORMING CONTAINERS FROM PLASTIC MATERIAL
Filed Aug. 17, 1927　　5 Sheets-Sheet 1

INVENTOR
Fred W. McArdle

March 12, 1929. F. W. McARDLE 1,705,024
MACHINE FOR FORMING CONTAINERS FROM PLASTIC MATERIAL
Filed Aug. 17, 1927 5 Sheets-Sheet 2

INVENTOR
Fred W. McArdle

March 12, 1929.  F. W. McARDLE  1,705,024
MACHINE FOR FORMING CONTAINERS FROM PLASTIC MATERIAL
Filed Aug. 17, 1927  5 Sheets-Sheet 4

Fig.10.

INVENTOR
Fred W. McArdle

Patented Mar. 12, 1929.

1,705,024

UNITED STATES PATENT OFFICE.

FRED W. McARDLE, OF BOSTON, MASSACHUSETTS, ASSIGNOR TO FRED L. PIGEON, OF EAST BOSTON, MASSACHUSETTS.

MACHINE FOR FORMING CONTAINERS FROM PLASTIC MATERIAL.

Application filed August 17, 1927. Serial No. 213,582.

My invention relates to machines for forming hollow ware from wood pulp and the like, and particularly to the class of machines in which such articles as caskets, bath-tubs and the like are molded on a foraminated former from liquid wood pulp.

Heretofore in machines of this character, difficulties have been experienced which operated against efficiency and rapidity of production, and it is my object to provide means for overcoming the difficulties hereinafter noted, and to provide a machine that shall be both efficient and rapid in operation.

One type of machine used for the purpose stated, comprises a plurality of platens slidable within the walls of the machine and actuated by hydraulic rams toward a foraminated former, for the purpose of expressing surplus water from a charge of liquid pulp admitted to the machine. A shell is thus deposited on the former, and the uniformity of thickness of the walls of the shell depends upon the pressure transmitted by the rams to units of surface in the respective platens. By differentiating the areas of the several rams relative to the areas of the particular platens on which they operate, an approximately uniform pressure is transmitted to the mass of liquid pulp within the machine. Any variation from actual uniformity of pressure on the unit areas of the platens, operates to produce an uneven thickness of the walls of the shell deposited on the former, and to overcome this difficulty, I provide means by which a uniform movement is imparted to the platens regardless of the exact ratio between particular platens and their actuating rams. This I do by connecting the rams in such manner that excess pressure on a particular platen is transmitted through the connections to the other platens to equalize the movement thereof, and thus produce a shell with walls of uniform thickness.

Unless pulp in a liquid state is continuously agitated or kept in motion, the solid matter will settle, and in the formation of articles of the nature referred to, where there is a material interval between charges of pulp, it is essential that the pulp valve be of a character that will cause minimum interference with the continuous circulation of the liquid pulp in the supply ducts; permit quick operation to charge the machine; when seated be approximately even with the inner wall of the machine; and with a minimum of space in which pulp may settle. To meet these requirements, I provide a pulp valve in which the body is formed to permit free circulation therethrough when the valve is closed, and when it is open, the full supply of pulp according to the capacity of the supply duct, is discharged into the machine.

When the molded article is of relatively large dimensions the pulp shell is of insufficient stability to permit handling unless suitably supported. Heretofore the removal of the shell after leaving the machine has been accomplished by means requiring several hand operations. This has slowed down the production, and to that extent interfered with the efficiency of the machine. To obviate this difficulty, I provide automatic means by which the shell is transferred from the position in which it has been discharged under the machine, and deposited beyond the machine in a position from which it may be transported to a suitable dry kiln, the means used returning to normal position to receive a succeeding shell.

My invention consists in the novel construction and operation of the means for attaining the above objects, and in the accompanying specifications and claims, and the drawings forming a part thereof, I have described and illustrated my invention in detail.

Figures 1, 2, 3, 4:
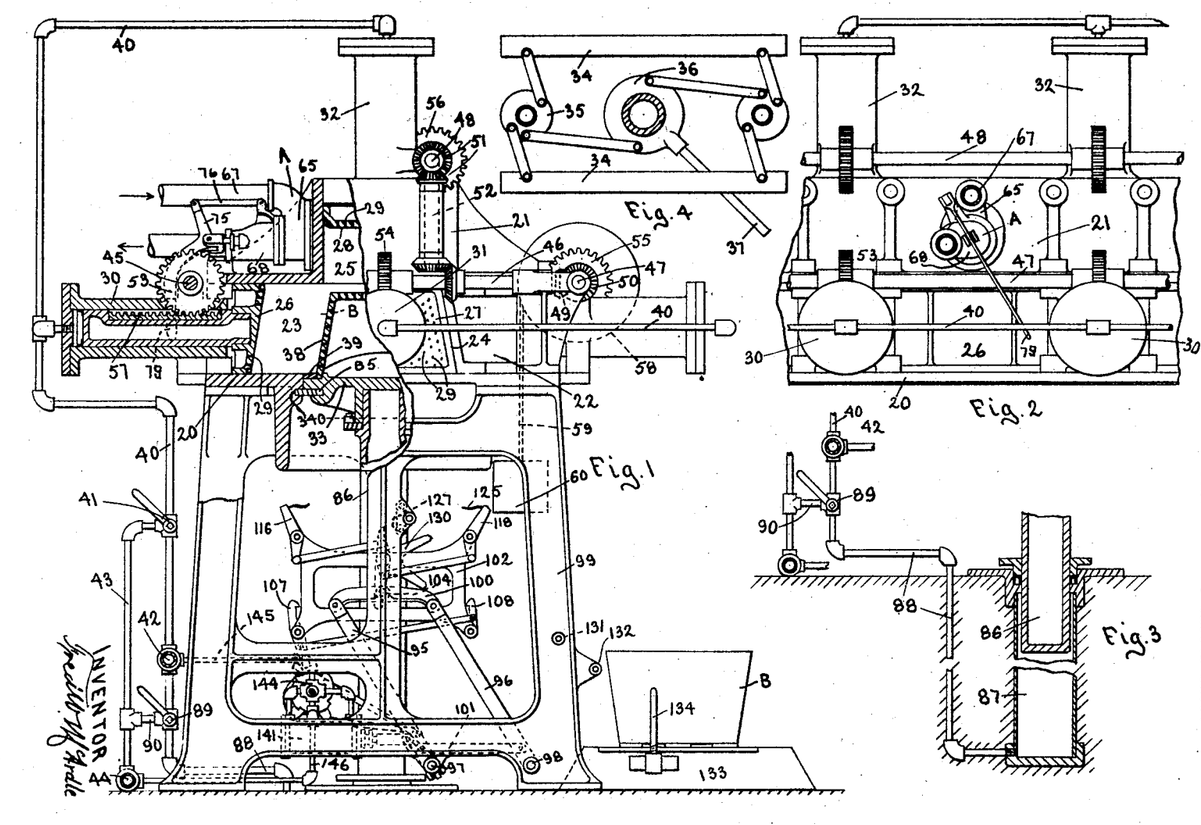
Fig. 1 shows a sectional elevation of a machine of the character described in which my invention is embodied.
Fig. 2 is a fragmentary end view in which the pulp valve is shown in relative position to the rams for one side platen.
Fig. 3 is a fragment showing in section the supporting platen for the former and stripper.
Fig. 4 is a plan of the locking means for the supporting platen.

In the drawings, one type of machine is illustrated in which such containers as caskets, tubs and the like are formed from liquid pulp, but my invention is applicable to other types of machines for the same purpose. In connection with the specifications of my invention, a brief description of the machine illustrated is essential to a clear understanding. The particular type of machine illustrated comprises a bed plate 20 and a cover member 21 which are spaced apart by means of corner elements 22 which form thereby, chambers 23, 24 in which are slidable the platens 26, 27 perforated at 29 to permit the escape of surplus water extracted from the pulp mass admitted to the machine. The cover member is formed with the walled opening 24, slidable in which is the platen 28 of similar character to those described. Each platen is adapted to be reciprocated in their particular chambers by means of rams, the cylinders of which 30, 31, 32 are secured to the bed plate 20 and the cover member 21. There is thus a plurality of chambers each having a movable polygonal wall. The bed plate is formed with a central opening through which the formed article is discharged from the machine, and the platen 33 serves as a closure thereto and as a supporting means for the former element as will be presently described. The platen which will hereinafter be referred to as the supporting platen, is adapted to be locked to the bed plate 20 by suitable means such as are shown in Fig. 4 in which the bars 34 are linked to the crank plates 35, and these in turn to the plate 36, the handle 37 supplying means for operating. When in locked position, the bars engage grooves in the bed plate as at 340, and when retracted, the supporting platen may be dropped as will be hereinafter described. Supported on the supporting platen 33 is a forming element 38 conforming outwardly to the shape of the interior of the article to be formed. This forming element is constructed with walls perforated as described in connection with the forming platens, through which surplus liquid may escape from similarly foraminated surfaces of the forming element. Loosely supported by the supporting platen and surrounding the forming element, is a stripper 39 on which the formed article rests as it is discharged from the machine. In the process of moulding a pulp article, fluid pulp is admitted to the machine through a pulp valve A which will be presently described, and fills the chambers 23, 24, 25 of the machine, the forming platens being withdrawn. Water under high pressure is admitted to the ram cylinders through the hydraulic supply pipe 40, admission to which from the hydraulic main 42 is controlled by a valve 41. This valve is preferably of the three way type which will permit the discharge of the water from the ram cylinders when the rams have performed their work, the waste water passing through the pipe 43 to the waste pipe 44. The total pressure on the rams connected to a particular platen is distributed to unit areas on the forming surface, and the resulting pressure per unit area of any particular forming platen is therefore dependent on the ratio between its total area and the combined area of the ram surfaces on which hydraulic pressure acts to operate the particular forming platen. Any variation therefore in the ratios between the areas of the several forming platens and their actuating rams, will operate hydraulically on the other rams through the respective forming platens, thus causing a variation in the thickness of the walls of the container deposited on the central forming element. To obviate this difficulty I have connected the several rams by means of gearing which insures uniform action of the rams and an equal advancement of the several platens. The shafts 45, 46, 47, 48 are operatively connected by means of bevel gears 49, 50, 51, a countershaft 52 serving to transmit movement to the shaft 48 from one of the shafts 46 operating in connection with the side rams. On these shafts are secured the pinions 53, 54, 55, 56 respectively meshing with racks rigid with the several rams as at 57. As the hydraulic power is applied the rams thus move uniformly inward, excess reactionary pressure on any forming platen being transmitted to all other platens and rams, and the uniform advancement of the forming platens exert pressure on the enclosed mass of liquid pulp and surplus water is expressed and a shell of semi solid pulp is deposited on the forming element. The valve 41 being rotated at this time to discharge position, the rams together with the forming platens are withdrawn to normal starting position by any suitable means, here indicated in the form of a counterbalance 60 supported by the cable 59 secured to a sheave 58, rigid with one of the gear shafts. As hereinbefore stated it is essential that the valve controlling the supply of pulp to the machine shall be of a character to insure quick action in opening and closing, a full current of pulp to the machine when open, and so constructed that the tendency for pulp to settle shall be reduced to a minimum.

Figure 5:
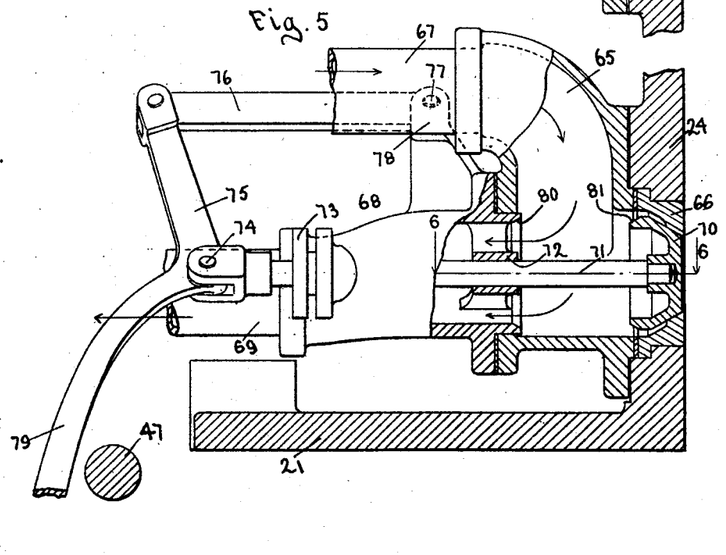
Fig. 5 is a sectional side elevation enlarged, of the pulp valve, with valve closed to the machine.
Figure 6:
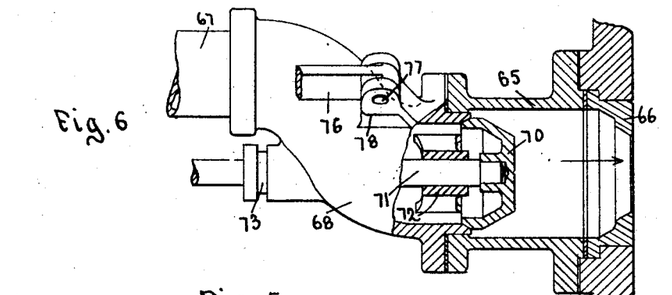
Fig. 6 is a sectional plan of same with valve open to admit pulp to the machine.
Figure 7:
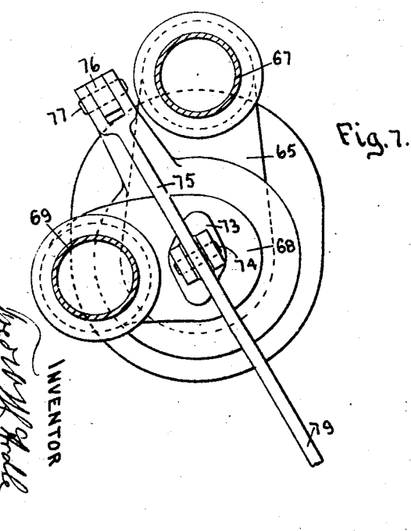
Fig. 7 is an end view showing the relation of the inlet and the outlet to the return duct of the circulatory system.

To secure the best results, it is advisable that a valve of the character described be interposed in a circulatory system from and to the source of pulp supply, in order that there shall be constant movement of the liquid pulp during the intervals between charges. In Figs. 1, 2, 5, 6, 7 I have shown a valve embodying the characteristics above noted. The body 65 is secured to the side wall of the chamber 24 through which there is an opening for the admission of pulp. The seat 66 is shown as a separate element for economic reasons but might be integral with the body or formed in the wall 24. The valve body 65 has an inlet connecting the chambered interior with the circulating system from the source of pulp supply, by means of the duct 67. Fitted to the body, fluid tight, is the offset duct 68 to which is connected the pipe 69 through which pulp may pass to the pulp main back to the source of supply. In effect the body 67 and the offset duct 68 constitute a single connecting element in the circulatory system. The plunger valve 70 normally seats in the element 66, its end being faced to align approximately with the inner face of the wall 24. The stem 71, rigid with the valve 70, is slidable in the bearing 72 and the packing gland 73. Hinged to the outer end of the valve stem at 74 is the lever 75 to one end of which is swivelled the link 76, correspondingly swivelled at 77 to the projection 78 from the offset member 68. In the other direction, the lever 75 is extended at 79 to form a handle by means of which the valve may be shifted. The inner end of the offset element 68 is formed with a seat 80 and the plunger valve with a corresponding portion 81 and when the valve handle is operated to admit pulp to the machine, the valve 70 is seated at 80, closing the outlet through the offset member 68, and permitting the full capacity of the inlet duct 67 to discharge into the interior of the machine, as shown in Fig. 6, thus filling the chambers in which the forming platens form each a wall. When the action is reversed, the valve is seated as shown in Fig. 5 and the full pulp current circulates through the offset member back to the circulatory system to the source of supply. By this means there is a uniform and uninterrupted flow of liquid pulp from the source of supply to the valve and therethrough insuring a supply of pulp to the machine of uniform consistency, which is the object required. Referring now to the formed shell deposited on the forming element 38, Figs. 1, 2, 3. When ready to discharge from the machine, the supporting platen 33 is released, the bars 34 being withdrawn as explained into the slots 85 formed in the supporting platen which is mounted on the ram column 86. The column together with the supporting platen, the foraminated former and the formed pulp shell resting on the stripper, may now descend for the purpose of discharging the shell. The ram is operated by hydraulic means in the cylinder 87, Fig. 3, as follows:— The pipe 88 to the 3 way valve 89 operates in the same manner as valve 41 described, permitting water under pressure to enter the lower end of the cylinder 87, and the ram is supported in its raised position during the interval in which the shell is being formed in the machine. When ready to discharge, the valve is operated to permit the ram and its supported elements to descend under the control of the operator, the contents of the cylinder escaping through the waste pipe 90 to the waste main 44. The device by means of which the shell is removed outside the limits of the machine, and which will presently be described, in normal position, is so disposed, that as the ram and the supporting platen descend, the stripper 39 engages with and is supported by elements of the device, without interfering with the continued descent of the ram, the supporting platen and the foraminated former, which is thus drawn from the shell to a position below the stripper. As the ram approaches its lowest position, a pawl swiveled on the supporting platen engages means by which the transfer device is operated to remove the shell, deposit it outside the limits of the machine and return to normal position carrying the stripper 39. The valve 89 is now operated to apply pressure to the ram cylinder 87, and as the ram rises, the supporting platen picks up the stripper 39 and the combination of supporting platen, foraminated former and stripper is raised to normal operating position in which the supporting platen is locked to the machine in readiness for forming another shell. The device for removing the shell and depositing it outside the limits of the machine is applicable to machines of other types than the one shown, but may best be described in connection with the particular machine illustrated in Fig. 1 and of which it forms an essential part for the reasons hereinbefore stated.

Figure 8:
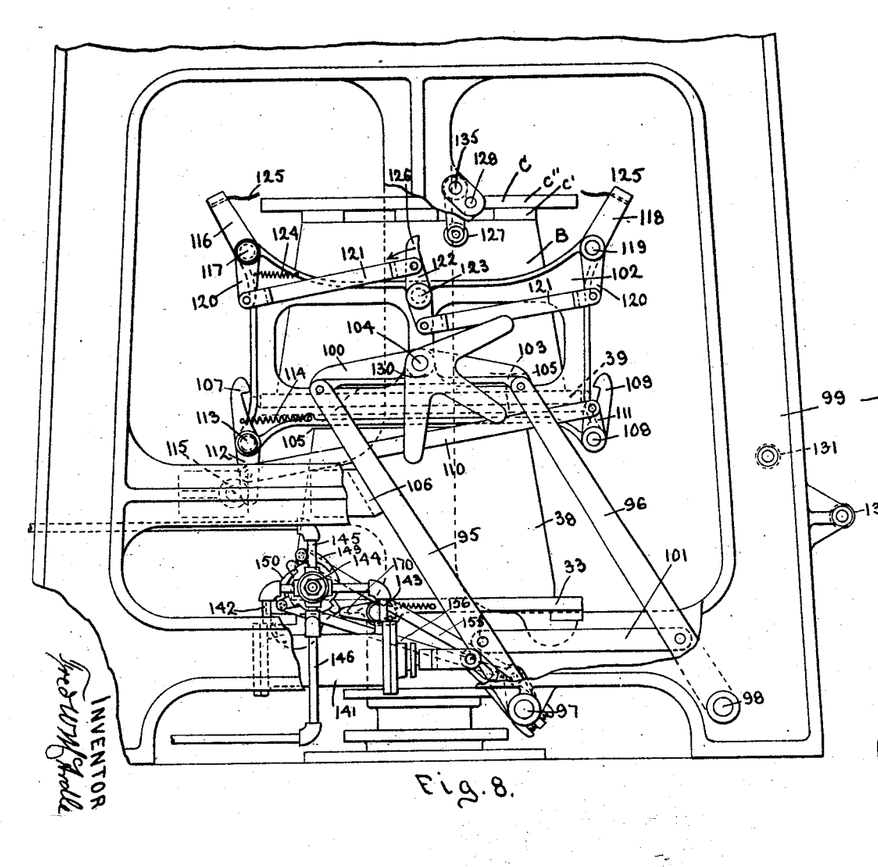
Fig. 8 is an enlarged side elevation of the transfer device.
Figure 9:
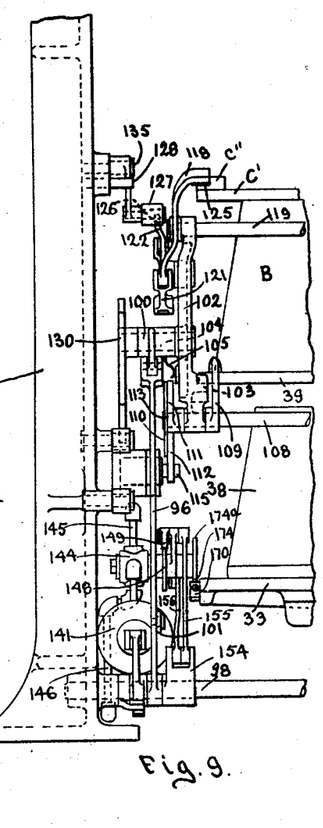
Fig. 9 is a fragmentary end view of same.

Referring to the enlarged views of the device, Figs. 8 and 9, the radius levers 95, 96 are secured respectively to the shafts 97, 98 which are journaled in the supporting standards of the machine. These levers and other supporting and locking details are duplicated at either end of the machine and within the standards. It is not essential however to duplicate the actuating elements for controlling the functions of the combination, as the constructions at either end of the machine are suitably connected to operate as a unit in the transferring operation. To the upper ends of the levers 95, 96 is hinged the beam 100, the axes of the hinges being equi-distance from the respective shafts, and spaced apart the same distance as the shafts laterally. This constitutes the well-known parallel motion, and as the levers are swung on the axes of the shafts, the beam 100 moves in parallel with a line passing through the axes of the shaft, laterally. The levers may also be connected at a suitable place by a hinged link 101, to assist in securing rigidity. The frame 102, the purpose of which will be presently described, is formed with an inwardly projecting ledge 103, and is swiveled to the beam 100, at 104, and this point of support is so disposed that the center of gravity of the loaded frame normally falls below the center of the swivel joint, which insures stability of the loaded frame as it is swung on 95, 96. To provide against rocking of the frame as the transferring operation is in progress, I provide a frictional contact between the beam 100 and the frame 102, by any suitable means, here shown as through leaf springs 105, preferably secured to the beam and yieldingly engaging the frame 102. The normal position of the frame when not in action is governed by means of an abutment 106 secured to one or both of the supporting standards 99, and engaging the lever 95. In this position as the supporting platen 33 descends through the operation of the ram 86, the stripper 39, underlying and supporting the formed shell B, engages the ledges 103 on the opposite frames 102, which thus function as a cradle to support the stripper and the superposed shell. The supporting platen together with the foraminated former 38 continues to descend, to a position in which the former is clear of the path of movement of the stripper when it is swung to transfer the shell. At this time the operator lays a rack on the shell which has been molded bottom up. This rack C is preferably constructed from longitudinal wood strips C′ to which are secured at either end the crossbars C″ also of wood, the construction being such that lightness is combined with rigidity. After the shell is discharged from the machine as described and the rack is placed, the operation of transferring and depositing the shell in a reversed position on a suitable support beyond the limits of the machine, and the transferring device returned to normal position together with the stripper, is automatic in action. It is first necessary to clamp the stripper to the frames 102, and the racks C to the shell to form with the frames a rigid unit. In providing for the clamping means, it is essential that they be so disposed that the supporting platen may descend without interference, that they will not engage the deposited shell as the device returns to normal position, and that the clamping means for the stripper shall be released to permit the supporting platen to pick the stripper from the ledges 103 as it rises to position in which another shell is to be formed. Swiveled to the rear lower corner of each frame 102, is the dog 107, the opposite corners being provided with bearings in which are journaled the cross shaft 108 to which is secured similar dogs 109, both dogs 107 and 109 being adapted to engage and hold the stripper 39 in position relative to the frames 102, clamping the stripper to the ledges 103. The link 110 is swivelled at either end to the arms 111 rigid with the cross shaft 108, and the arm 112 rigid with the stud 113, to which the dog 107 is also rigidly secured. The arm 112 is downwardly extended, and when the device is in position to receive a shell, the dogs are withdrawn from the path of the descending platen and stripper, by means of a stop 115 secured to one or both the supporting standards 99, engaging the extension of the arm 112, the spring 114 exerting a yielding tension to draw the dogs 107 into clamping position relative to the stripper 39, as the device is started in its operation of transferring the shell. Through the medium of the link 110 the dogs 109 are similarly operated to clamp the opposite side of the stripper. The upper corners of each frame 102 are similarly provided with dogs 116 journaled on the stud 117, projecting from the frame 102, and similar dogs 118 rigid with the cross shaft 119, journaled in the frames 102. The dogs 116 and 118 are formed with downwardly extending arms 120, to which are swiveled the links 121, which are also swiveled to the rock lever 122 journaled on the stud 123 outwardly projecting from the frame 102, the spring 124 operating to retain the dogs in normal withdrawn position relative to the rack C on which they act. Each of the dogs is provided with a blade 125 which is adapted to engage the cross bars C″ of the rack C near the ends, and when in engagement to exert a yielding pressure sufficient to retain the rack in engagement with the shell B, and to cooperate with the frames 102 and the stripper 39 to insure stability as the transferring device is operated. Swiveled to one of the standards 99 is a swinging abutment 127, limited in its movement in one direction by the stop pin 128. The rock lever 122 is provided with an extension 126, and as the transferring device is operated this extension engages the abutment 127, and rotating on its stud, operates through the medium of the links 121 to clamp the rack to the shell B.

Figure 10:
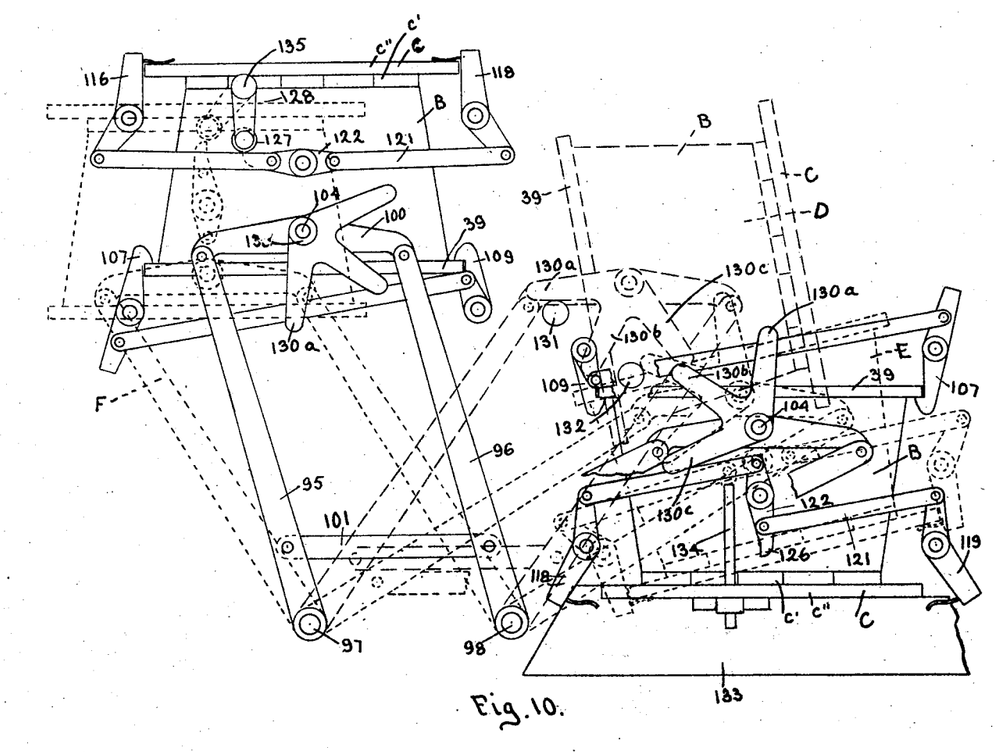
Fig. 10 illustrates diagrammatically the operation of the mechanism of the device.
Figures 11, 12, 13, 14:
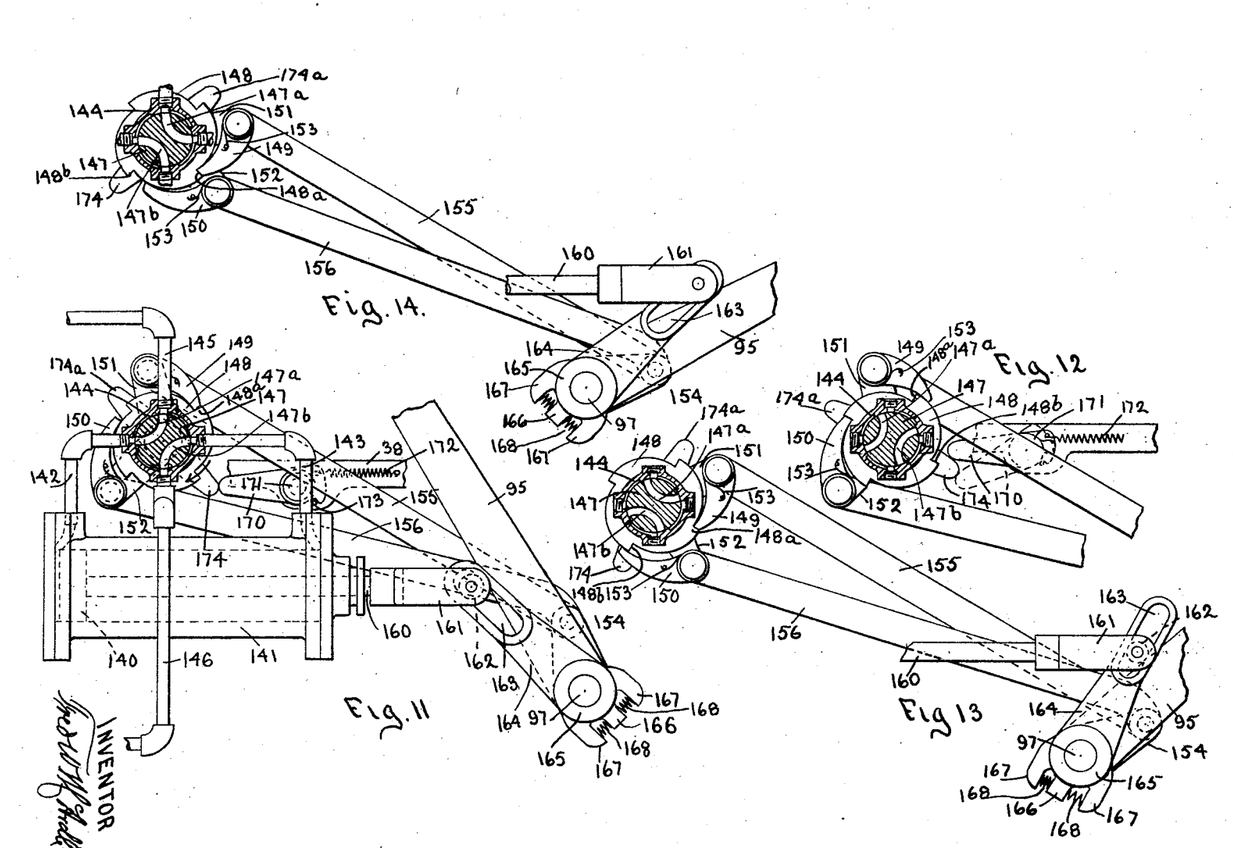
Fig. 11 is an enlarged elevation of the ram and connections for operating the transfer device, at the beginning of the cycle of transferring.
Fig. 12 shows the position of the parts when the supporting platen is near its lowest position, and the pawl carried thereby, about to open the hydraulic valve to the ram cylinder.
Fig. 13 shows the position of parts when the hydraulic valve is in closed position preceding reversal of the hydraulic current.
Fig. 14 shows the position of parts at the beginning of the return movement of the transferring device.

As the transferring device is operated by means hereinafter described, the radius levers 95, 96 are operated to swing the frames 102 in a path predetermined by the arcs through which the levers swing. As the device is started, the action of the spring 114 operates to clamp the stripper 39 to the ledges 103, as the frames recede from the abutment 115 and the extension of the lever 112 is released from engagement therewith. As the movement of the levers continues, the extension 126 of the rock lever 122 engages the abutment 127, and assumes the position shown in Fig. 10 in which the dogs are in clamping position relative to the rack C, and the hinged joints of the links 121 are respectively aligned with the center of rotation of the arm 122, in which position the swivel connection between the links and the arm 122 are on dead centers relative to the bearing of the rock lever, and the dogs 116 and 118 are locked against accidental release. Rigid with the trunnion 104 to which is also secured the frame 102 is a three armed element 130. As the levers continue their swing, the arm 130ᵃ engages an abutment 131, Figs. 1, 5, 10 projecting from one or both standards 99, and the frames 102 with its load is partially rotated about the center of rotation 104 as shown at D Fig. 10. As the movement of the levers 95, 96 continue, the arm 130ᵇ engages the abutment 132 and the loaded frame is rotated to the position indicated at E, at which time the shell is in a nearly reversed position, and the rack C at one side in close relation to bolsters 133 supported on the floor or foundation outside the limits of the machine. For these bolsters may be substituted a truck or other support. As the shell approaches the bolster, the rock lever engages the stop 134 which in this case is secured to the bolster, and continued swing of the levers 95, 96 operates in connection with the stop to rotate the rock lever in the reverse direction of locking, to release the blades of the dogs 116, 118 from the rack C at the approximate moment of contact with the bolsters of the rack members C′. As the shell is released and the rack supporting it rests on the bolsters, the movement of the radius arms is reversed and the arm 130ᶜ engages the abutment 132 as the transferring device starts on its return swing. This is made possible in the following manner:— When the arm 130ᵇ ceases engagement with the abutment 132 during the transferring process, the shell B as stated is in a nearly reversed position in which one edge of the rack C is about to engage the bolsters 133. When this occurs the shell together with the three armed member is rotated to a completely reversed position, and the arm 130ᶜ is thus brought to a position in which it will engage with the under side of the abutment 132 as the device is swung back to normal position. The frame is thus rotated in a reverse direction, and the arm 130ᵇ engaging the abutment 131, completes the rotation to normal position relative to the frames 102, and the stripper 39 in clamped position. As the transferring device approaches the normal loading position shown at F, Fig. 10, the rock lever 122 which is now in unlocked position, engages the back side of the swinging abutment 127, which is swung on its stud 135, as shown by dotted lines, the lever passing on and the abutment swinging back to place against the pin 128, the device coming to rest against the abutment 106, and the extension of the arm 112 engaging the abutment 115, thus releasing the dogs 107 and 109 from clamping engagement with the stripper 39. To operate the transferring device throughout its cycle, I prefer to employ automatic means, and have shown such means in the drawings, but do not confine myself to the type of construction shown as other means within the scope of the claims may be used to accomplish the same object. As shown in the drawings, Figs. 1, 7, 11, I employ a hydraulic ram 140, reciprocating in the cylinder 141, provided at each end with hydraulic connections 142, 143 connecting with a four way valve. This valve comprises a body 144 in which are four passages connecting with a central passage in which is rotatable a plug valve 147. Two of the passages in the valve body are connected by the pipes 142 and 143 with opposite ends of the ram cylinder 141, and the other two respectively with the hydraulic main 42 through the pipe 145, and the waste main 44 through the pipe 146. The plug 147 is fitted fluid tight in the body 144, Figs. 11–14, and is provided with duplicate ducts therethrough so disposed that either may align with the hydraulic supply and one end of the ram cylinder inlet pipe, while the other duct aligns with the pipes leading from the other end of the cylinder, and the waste pipe. Rigid with the projecting stem of the plug, is the plate 148, on the periphery of which is formed teeth corresponding relatively with the duct openings through the plug. Pawls 149 and 150 are swiveled respectively to the pawl arms 151 and 152, springs 153 maintaining contact of the pawls with the periphery of the plate 148, which functions as a ratchet through which the plug is rotated by the action of the engaging pawls. Rigid with the shaft 97 is an arm 154, and links 155 and 156 are hinged to the arm and to the respective pawl arms 151 and 152, which are in such relation that the movement of the radius levers when in the operation of transferring, operates through the connections described, to swing the pawl arms through an arc of 90 degrees, the pawls engaging the ratchet in the manner to be presently described. In order that the transferring device may be automatically operated, it is necessary that the valve plug, normally in closed position during the moulding of a shell, be opened to admit water to the ram cylinder, and to so dispose the pawl arms and respective pawls relative to the ratchet, that at the end of the transferring movement of the radius levers, the operation of the ram will be reversed and as the transferring device returns to normal position for receiving another shell, the valve must be closed until the shell is deposited on the ledges of the frame 102. In order that the valve may be automatically opened, it is necessary to employ means separate from the transferring device itself, as no movement of the pawl arms is possible until the radius arms are in motion. Referring to Figs. 11, 12, 13, the ram 140 is provided with the stem 160, to which is secured the forked member 161 in which is journaled the roll 162, engaging the slot 163 in the lever 164 connected as will be presently described with the shaft 97 which as explained is rigid with the arm 154 and the radius arm 95.

The means for opening the valve in order to start the transferring operation is as follows:—Swiveled to the supporting platen 33 and contiguous to the hydraulic valve is the pawl 170 journaled on the projecting stud 171. As the supporting platen descends I utilize its movement to initially operate the hydraulic valve to admit water to the ram cylinder through the pipe 142. Secured to the valve stem of the plug valve 147 is the lever 174, and rotatable therewith. This lever is so positioned on the stem relative to the ducts through the plug, that when the valve is in closed position previous to the operation of the transferring device as shown in Fig. 12, the lever is in a position in which it may be engaged by the pawl 170 on the descending supporting platen, the pawl being yieldingly held in a raised position in which it will intersect the rotative path of the lever 174 by a spring 172, which retains the pawl against the stop pin 173. When the supporting platen 38 is near its downward limit of movement, and the foraminated former has been withdrawn from the shell and is clear of the stripper 39, this pawl engages and rotates the lever on its stem to a position in which the duct 147$^a$ is aligned with the openings in the body connecting by the pipe 145 with the hydraulic supply, and by the pipe 142 with the ram cylinder at the end next the retracted ram. The duct 147$^b$ is correspondingly aligned with connections to the other end of the cylinder and the waste main 44. The pawl 149 which previous to the action of the lever 174 engaged the periphery of the ratchet 148, is now in engagement with the tooth 148$^a$, and as the ram operates through connections hereinbefore described to swing the shaft 97 and through other connections the loaded frame 102, the plug 147 is rotated by means of the connections to the pawl arm 151. As the valve is rotated in the direction of the arrow Fig. 11, the flow of water either to or from the cylinder is temporarily interrupted as the respective ducts are closed to the passages through the body. In order that this interval may be reduced to a minimum, I have relieved the interior of the valve body, and rely on the momentum of the moving parts to act in conjunction with the following means to complete the transferring action before opening the valve for the purpose of reversing the action of the ram. During the interval in which the valve is closed as shown in Fig. 13, it is obvious that as neither the outlets nor the inlets to the ram cylinder are open, that the ram is stopped in its movement either way, and to provide for this condition I have connected the slotted lever 164 to the shaft 97 yieldingly so that the momentum of the loaded frame 102 will operate to continue the swing of the shaft to which is rigidly secured the arm 154, by means of which the valve is operated through the connections hereinbefore described. A means to secure this result is as follows:—Secured to the shaft 97 rigidly is a collar 165 formed with a projecting lug 166. Projecting from the lever 164 are the extensions 167 adapted to swing in the same plane as the lug 166. Interposed between each side of the lug in the rotative plane, and the respective extensions 167, is a relatively stiff spring 168, through which the movement of the shaft 97 is transmitted to the lever 164. Normally the collar 165 and this lever will function practically as a single element, but as the valve is closed as shown in Fig. 13, the momentum of the moving loaded frames 102 will operate on the shaft 97 to continue the swing of the lug 166, thus compressing one of the springs 168, as the lever 164 connected to the ram resists. The connections for operating the valve are operative meanwhile, and the valve is opened to admit pressure to the ram to return the transferring device to normal position. The springs also operate to cushion the moving parts at each end of their travel, and the adjusted position of the stop 106 is such that the compression of the spring 168 at that end of the travel is only sufficient to prevent leakage of the valve and insure complete closure. Fig. 11 shows the position of the parts as the supporting platen has completed its downward movement and the pawl 170 has operated in connection with the lever 174 to open the valve and start the cycle of transferring operation. When the duct 147$^a$ has been operated to reverse the hydraulic action on the ram, as the shell is deposited, the arm 152 to which is swiveled the pawl 150, and which has been withdrawn during the previous part of the cycle, is now in position to operate on the tooth 148$^b$ to rotate the ratchet and the plug 147 to the position shown in Fig. 12 when the transferring device has been swung to normal position and the ducts in the plug closed against hydraulic current through either. The valve 89 is now opened to admit hydraulic pressure to the bottom end of the ram 86, and the supporting platen as it rises to normal position for the forming of a shell, picks up the stripper 39, the transferring device remaining at rest until started by the descending platen after the shell has been formed. Attention is called to the fact that in the second cycle of transferring operations ducts 147ª and 147ᵇ reverse functions, and to provide for such intermittent action I provide the arm 174ª integral with the arm 174 and functioning in similar manner intermittently.

Having described my invention, I claim:—

1. In a machine for forming receptacles from wood or other liquid pulp, and including as elements a foraminated former, a plurality of compressor platens disposed thereabout and radially slidable therewith, each actuated by an independent hydraulically operated ram; the combination therewith of means operating on all the rams whereby the individual compressor platens are uniformly advanced toward the former for the purpose of expressing surplus liquid from the pulp and depositing on the former a shell with walls of even thickness.

2. In combination with a machine of the character described in claim 1, a rack rigid with each ram; pinions engaging each rack and respectively rotatable with shafts geared together to rotate in unison as the hydraulic pressure is applied to the rams; for the purpose of controlling the movement of the rams to secure uniform radial advancement of the individual compressor platens toward the former as and for the purpose described.

3. In combination with a machine of the character described, a chambered element rigid with one wall of the machine; an inlet to the chamber; a duct connecting the inlet with a source of pulp supply, and through which a continuous and uniform current of liquid pulp may flow; an outlet from the chamber through which the pulp may be discharged into the machine; an outlet through which the pulp may be discharged and returned to the source of supply; a plunger movable within the chamber and adapted to function as a closure to either outlet; and means exterior to the chamber, by which the plunger may be operated to close either outlet.

4. In combination with a machine of the character described, a chambered element rigid with one wall of the machine; an inlet to the chamber; a duct connecting the inlet with a source of pulp supply, and through which a continuous and uniform current of liquid pulp may flow; an outlet from the chamber through which pulp may be discharged into the machine; an outlet through which the pulp may be discharged and returned to the source of supply; a plunger movable within the chamber and formed with one face which will be approximately in alignment with the interior wall of the machine when functioning as a closure to the outlet thereto; another face adapted to function as a closure to the other outlet; and means exterior to the chamber by which the plunger may be operated to close either outlet thereby opening the other.

5. In a machine for moulding containers from plastic material, and including as elements a chamber to receive plastic material; a movable platen constituting one side thereof; a former having foraminous walls supported by the platen; a stripper supported by the platen and surrounding the base of the former; and means for lowering the platen for the purpose of discharging the formed article from the machine; the combination therewith of automatic means for transferring the discharged article beyond the limits of the machine.

6. In a machine of the character described in claim 5, the combination therewith of automatic means for transferring the discharged article in a reversed position beyond the limits of the machine.

7. In a machine of the character described in claim 5, the combination therewith, of automatic means for transferring the discharged articles beyond the limits of the machine, coordinated with the discharging action of the machine.

8. In a machine of the character described in claim 5, the combination therewith of automatic means for transferring the discharged article beyond the limits of the machine, the operation of which is controlled by the discharging device.

9. In a machine for moulding receptacles from plastic material a transferring device for removing the discharged article beyond the limits of the machine, comprising a pair of carrier members hinged to respective pairs of similar radius levers adapted to swing through predetermined arcs on axes parallel and intersecting the machine supports near their bases, and equally spaced with the hinged joints of the carrier members, for the purpose of retaining such members in parallel relation with a line laterally intersecting the axes on which the levers swing; and means for automatically swinging the levers.

10. In a transferring device of the character described in claim 9, frames pivoted to the carrier members and adapted to be engaged by and to support a stripper supporting a moulded article.

11. In a transferring device of the character described in claim 9, frames pivoted to the carrier members and adapted to be engaged by and to support a stripper supporting a moulded article; and means for automatically securing the stripper to the frames.

12. In a transferring device of the character described in claim 9, frames pivoted to the carrier members and adapted to be engaged by and to support a stripper supporting a moulded article; means for clamping the stripper to the carrier frames; and means for clamping the moulded article in position to be transferred, the clamping means being automatically operative as the transferring device is swung on its axes.

13. In a transferring device of the character described in claim 9; frames pivoted to the carrier members and adapted to be engaged by and to support a stripper supporting a moulded article; means for clamping the stripper to the carrier frames; means for clamping the moulded article in position to be transferred; and means operated through the swinging action of the levers, for automatically clamping the stripper and the moulded article respectively, and means for reversing the article in transit.

14. In a transferring device of the character described in claim 9; frames pivoted to the carrier members and adapted to be engaged by and to support a stripper supporting a moulded article; means for clamping the stripper to the carrier frame; means for clamping the moulded article in position to be transferred; means operated through the swinging action of the levers, for reversing the moulded article in transit; and means automatically operating to release the article transferred; and means for automatically releasing the stripper from the carrier frames when in normal position relative to the discharging device of the machine.

15. In combination with a transferring device of the character described in claim 9, an hydraulic device operatively connected to the transferring device and automatically controlled for the purpose of swinging the transferring device from normal position to a position in which the moulded article may be deposited beyond the limits of the machine, and thereafter swing the transferring device back to normal position.

16. In a machine of the character described in claim 5, the combination therewith of automatically operating transferring mechanism to remove the formed article beyond the limits of the machine, and including a hydraulic actuating element; means connected with the discharging device of the machine by which the admission of water under pressure to the hydraulic device for the purpose of operating the transfer mechanism, is controlled.

17. In a transferring device of the character described, and including a hydraulic actuating element, means connected to and movable with the transferring device, by which the operation of the hydraulic action is automatically reversed when the transferring device is swung to a position in which the moulded article may be deposited beyond the limits of the machine.

18. In a machine of the character described in claim 5, the combination therewith of a transferring device for depositing the discharged article beyond the limits of the machine including carrier members hinged to radius levers adapted to swing outwardly from beneath the discharge opening and at either end of the machine; connected frame members swiveled to the frame members and forming a cradle to support the stripper of the machine with its imposed formed shell when discharged from the machine; connected clamps adapted to clamp the stripper to the frame members, and movable therewith; other connected clamps adapted to clamp a rack laid on the discharged shell thereto and rigid relative to the stripper; means for automatically swinging the radius levers outwardly for the purpose of depositing the shell beyond the limits of the machine and returning the levers to position in which the stripper may be engaged by the discharging means of the machine; means for automatically releasing the clamps from the rack; and other means for automatically releasing the clamps from the stripper.

19. In a transferring device of the character described in claim 9, and including as elements a cradle pivoted to the carrier members and adapted to be engaged by and to support a stripper supporting a moulded article, means for clamping the stripper to the cradle; means for clamping the moulded article in position to be transferred, means for swinging the levers for the purpose of swinging the transferring device from normal position to a position in which the article may be deposited beyond the limits of the machine; in combination therewith, a member rigid with swivel of the cradle frames; abutments projecting from a standard of the machine and adapted to be engaged by the member secured to the swivel, for the purpose of reversing the loaded cradle as it is swung outwardly, and depositing the shell beyond the limits of the machine in reversed position.

FRED W. McARDLE.